(12) United States Patent
Xiao et al.

(10) Patent No.: US 12,517,057 B2
(45) Date of Patent: Jan. 6, 2026

(54) INTERACTION OF SPECTROSCOPY AND ARTIFICIAL INTELLIGENCE FOR SEROLOGICAL ANALYSIS AND ITS APPLICATIONS

(71) Applicant: WUHAN UNIVERSITY, Wuhan (CN)

(72) Inventors: Xiangheng Xiao, Wuhan (CN); Shilian Dong, Wuhan (CN); Fubing Wang, Wuhan (CN); Changzhong Jiang, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 81 days.

(21) Appl. No.: 18/596,665

(22) Filed: Mar. 6, 2024

(65) Prior Publication Data

US 2024/0210324 A1 Jun. 27, 2024

Related U.S. Application Data

(63) Continuation of application No. PCT/CN2022/114961, filed on Aug. 25, 2022.

(30) Foreign Application Priority Data

Sep. 7, 2021 (CN) .......................... 202111044298.2

(51) Int. Cl.
| | |
|---|---|
| *G01N 21/65* | (2006.01) |
| *G01N 1/28* | (2006.01) |
| *G01N 33/543* | (2006.01) |

(52) U.S. Cl.
CPC ......... *G01N 21/658* (2013.01); *G01N 1/2813* (2013.01); *G01N 33/54346* (2013.01);
(Continued)

(58) Field of Classification Search
CPC ............... G01N 21/658; G01N 1/2813; G01N 33/54346; G01N 2001/2846; G01N 2201/1296; G01N 2800/7028
See application file for complete search history.

(56) References Cited

U.S. PATENT DOCUMENTS

| | | | | |
|---|---|---|---|---|
| 8,003,408 B2 * | 8/2011 | Zhang | .................... | B82Y 30/00 |
| | | | | 424/490 |
| 12,101,609 B1 * | 9/2024 | Mazed | ...................... | G02F 3/00 |

(Continued)

FOREIGN PATENT DOCUMENTS

| | | |
|---|---|---|
| CN | 101799421 A | 8/2010 |
| CN | 108872182 A | 11/2018 |

(Continued)

OTHER PUBLICATIONS

Kaiyuan Liu, Application of Surface Enhanced Raman Spectroscopy in Rapid Screening of Lung Adenocarcinoma, Master Dissertation, China Jiliang University, 2019, pp. 1-70.

(Continued)

*Primary Examiner* — Michael P LaPage
(74) *Attorney, Agent, or Firm* — Bayramoglu Law Offices LLC

(57) ABSTRACT

A spectroscopy and artificial intelligence-interaction serum analysis method includes: collecting bulk SERS spectral data of clinical serum samples, performing dimension reduction on the spectral data by using a covariance matrix to obtain spectral different peak positions of cancer patients and normal individuals, and performing spectral data processing and algorithm identification by using an svm model of an artificial intelligence algorithm to obtain a cancer identification rate. Compared with the conventional serum analysis method, the spectroscopy and artificial intelligence-interaction serum analysis method requires no antibody-antigen or other biological specificity modification processes, and the serum of cancer patients and normal individuals can be identified more cheaply, rapidly and accurately. Also the different peak positions in SERS spectra of a large amount of serum samples can be located, which provides an entirely novel detection and analysis method at (Continued)

a molecular bond energy level for the field of liquid biopsy of clinical cancers.

7 Claims, 11 Drawing Sheets

(52) U.S. Cl.
CPC ............... *G01N 2001/2846* (2013.01); *G01N 2201/1296* (2013.01); *G01N 2800/7028* (2013.01)

(56) References Cited

U.S. PATENT DOCUMENTS

| | | | | |
|---|---|---|---|---|
| 2019/0034518 | A1* | 1/2019 | Liu | G06F 16/285 |
| 2021/0360338 | A1* | 11/2021 | Mazed | H04J 14/0256 |
| 2022/0000414 | A1* | 1/2022 | Lednev | A61B 5/0075 |
| 2024/0132967 | A1* | 4/2024 | Tan | G01N 33/57488 |

FOREIGN PATENT DOCUMENTS

| | | | | |
|---|---|---|---|---|
| CN | 109765214 | A | | 5/2019 |
| CN | 111812078 | A * | 10/2020 | ......... G06F 18/2414 |
| CN | 115078331 | A | | 9/2022 |
| WO | 2021172944 | A1 | | 9/2021 |

OTHER PUBLICATIONS

Jinmei Xie, Study on the Differential Diagnosis of Non-Hodgkin's Lymphoma Using SERS Technique Based on Serum Samples, Dissertation for the Master Degree in Engineering, Harbin Institute of Technology, 2020, pp. 1-61.

Xinjiang Lu, et al., Collaborative Learning-Based Clustered Support Vector Machine for Modeling of Nonlinear Processes Subject to Noise, IEEE Transactions on Systems, Man, and Cybernetics: Systems, 2020, pp. 5162-5171, vol. 50, No. 12.

* cited by examiner

Characteristic Raman peaks of 244 lung cancer samples &350 normal samples after dimensionality reduction (unit: cm$^{-1}$)

| 600 | 618 | 649 | 653 | 707 | 744 | 748 | 795 | 837 | 843 |
|-----|-----|-----|-----|-----|-----|-----|-----|-----|-----|
| 847 | 848 | 898 | 943 | 944 | 992 | 1004 | 1039 | 1043 | 1072 |
| 1092 | 1139 | 1156 | 1188 | 1197 | 1237 | 1240 | 1286 | 1289 | 1320 |
| 1370 | 1383 | 1387 | 1429 | 1436 | 1478 | 1485 | 1526 | 1534 | 1559 |
| 1584 | 1631 | 1637 | 1680 | 1704 | 1729 | 1732 | 1746 | 1786 | 1800 |

FIG. 4

Characteristic Raman peaks of 216 colorectal cancer samples &350 normal samples after dimensionality reduction (unit: $cm^{-1}$)

| 600 | 623 | 650 | 695 | 706 | 744 | 748 | 795 | 838 | 843 |
|---|---|---|---|---|---|---|---|---|---|
| 848 | 857 | 896 | 898 | 944 | 964 | 1004 | 1039 | 1043 | 1063 |
| 1092 | 1139 | 1154 | 1187 | 1197 | 1237 | 1274 | 1287 | 1289 | 1324 |
| 1377 | 1385 | 1388 | 1389 | 1436 | 1467 | 1485 | 1528 | 1534 | 1559 |
| 1584 | 1631 | 1633 | 1670 | 1684 | 1730 | 1733 | 1779 | 1786 | 1800 |

FIG. 6

INTERACTION OF SPECTROSCOPY AND ARTIFICIAL INTELLIGENCE FOR SEROLOGICAL ANALYSIS AND ITS APPLICATIONS

CROSS REFERENCE TO THE RELATED APPLICATIONS

This application is the continuation application of International Application No. PCT/CN2022/114961, filed on Aug. 25, 2022, which is based upon and claims priority to Chinese Patent Application No. 202111044298.2, filed on Sep. 7, 2021, the entire contents of which are incorporated herein by reference.

TECHNICAL FIELD

The present invention belongs to the field of nanomaterials and artificial intelligence, and particularly relates to a spectroscopy and artificial intelligence-interaction serum analysis method and an application in high-accuracy identification and different SERS peak position analysis of various cancer patients and normal people.

BACKGROUND

Cancer, as a worldwide disease that seriously threatens human life, takes countless lives in a terrible amount every year. Although new cancer therapies have been put into use, the complexity and heterogeneity of tumors make existing clinical treatment protocols ineffective. In recent years, great attention has been paid on liquid biopsy technique for the detection and classification of cancers, also known as a non-invasive diagnostic technique for tumors. As a branch of in vitro diagnosis, liquid biopsy can achieve early screening, molecular typing, medication guidance, recurrence monitoring, and clinical applications of cancers by detecting free circulating tumor cells, circulating tumor DNA, proteins, and other cancer-related biomolecules in human urine, sweat, blood and other body fluids. Liquid biopsy has great clinical significance and application prospects for efficient cancer screening and diagnosis without causing damage to patients, thereby being rated as one of the top ten breakthrough technologies in 2015 by MIT Technology Review. Among them, serum, as the most widely used cancer liquid biopsy biological sample in medicine at present, is a yellowish transparent liquid separated after removing fibrinogen and certain coagulation factors from plasma. Its main functions are to provide basic nutrients, hormones and various growth factors, to provide conjugated proteins, to provide contact-promoting growth factors to protect cell adhesion from mechanical damage, to protect cells in culture etc. Biomolecules contained in serum are closely related to growth/inhibition of human cells, and therefore the development and expansion of serum analysis is of great significance for current liquid biopsy of cancers.

Most of the major analytical methods for serum at present are targeted identification and detection of certain specific and known small biomolecules in serum through specific biological interactions such as antibody-antigen and base complementarity. Taking the detection of proteins in serum as an example, enzyme-linked immunosorbent assay and Western blot analysis are commonly used in medicine at present. When it is necessary to determine a content of a certain protein in serum, these two commonly used medical methods must carry out a specific antibody labeling process matching the protein, but this kind of labeling process is more cumbersome and more expensive.

Surface enhanced Raman scattering (SERS), as a physical spectroscopy technique, is based on the principle of using plasmon resonance between the noble metal (Au, Ag, Cu, etc.) substrate and excitation laser to significantly amplify the molecular Raman scattering spectrum near substrate surface, and then the molecular internal structure spectral information, which is similar to a human fingerprint, can be obtained with extremely high sensitivity. Currently, it is a hot spot to use the SERS method to solve biological problems. The main reason is that traditional medical detection methods have disadvantages of time consumption and low efficiency, while SERS spectrum collection often takes an extremely short time (within 10 minutes) and has extremely high sensitivity (enhancement factors can reach 1013).

Although the SERS method has the above advantages, there are still some problems to be solved for current clinical serum detection and analysis. For example:

(1) At present, the mainstream method of applying SERS technique to pathological diagnosis is to firstly combine biomolecules modified with Raman microprobes with an SERS substrate, then anchor free biomarkers in body fluids on the SERS substrate by the help of biospecific interaction, and finally indirectly analyze the biomarkers (such as RNA, DNA, proteins, polypeptide, etc) under study through the signal change of the Raman probes. It is difficult to obtain essential information of the biomarkers by this method, and the use of biospecific correlated antibody-antigens makes such cancer detection method costly. Therefore, it is an urgent problem to find a direct, efficient and cheap SERS method to detect the essential information of the biomarkers.

(2) When the number of biological samples to be detected becomes larger, the amount of spectral data collected by the SERS technique also becomes larger, which makes it difficult to distinguish the data directly and effectively by manpower. For example, for analysis of serum SERS data of hundreds or even thousands of cancer patients/normal people, the human eyes cannot make systematic statistically differentiated. Therefore, finding a way to identify a large amount of spectral data is a must to make the SERS technique truly applicable to clinical medicine.

(3) With the current SERS technique, even though the spectra of some cancer markers can be obtained directly or indirectly, it is difficult to identify the difference peak of SERS spectra between different samples by human eyes when the amount of the sample data of the cancer markers increases. Therefore, finding a reliable method to locate different SERS peak positions in a large amount of samples is also an important way to effectively promote the SERS technique in actual cancer diagnosis and treatment.

SUMMARY

Aiming at defects in the prior art, the present invention aims to realize rapid, cheap and accurate high-throughput cancer detection by interacting spectroscopy and artificial intelligence algorithm to perform differential analysis of a large amount of cancer patients and normal people serum samples. The spectroscopy and artificial intelligence-interaction serum analysis method can simultaneously realize high-accuracy identification of various cancer patients serum and normal people serum and accurately locate different SERS peak positions. This method is expected to play an important role in actual clinical cancer-related serum detection.

The object of the present invention is realized by the following technical solutions:

A spectroscopy and artificial intelligence-interaction serum analysis method uses silver nanowires without an intrinsic Raman signal as SERS microprobes, and a silver nanowire solution was directly liquid-phase mixed and co-incubated with serum samples from diseased patients and normal individuals without any specific labeling process, respectively. After incubation, serum SERS spectral data acquisition was performed to obtain original spectral data points under the test of a Raman spectrometer; Subsequently, the dimension reduction was performed on the original spectral data points by using a covariance matrix algorithm. The spectral data points obtained by dimension reduction are thus different peak positions of the diseased samples compared with the normal samples. Then, the classification training and identification are performed on the spectral data after dimension reduction by using a support vector machine (svm) model to output identification accuracy rates of the different diseased samples compared with the normal individuals.

Preferably, the serum analysis method includes the following steps:

(1) Remove silver nanoparticle impurities in the original silver nanowire solution (preferably, the original silver nanowire solution is centrifuged to remove the impurities, and the silver nanoparticle impurities are in a supernatant), and then resuspend the silver nanowire precipitate in deionized water and dispersing to obtain a silver nanowire solution for later use; In addition, centrifug peripheral blood plasma samples from different types of diseased patients and normal human beings to obtain corresponding serum samples for later use;

(2) The silver nanowire solution was incubated with all the above serum samples according to a fixed volume ratio of liquid-phase mixing to ensure that the silver nanowires are fully contacted with the serum, and after the incubation was completed, all the samples were subjected to bulk-phase SERS spectral data acquisition by using Raman spectrometer. During spectrum collection, the laser wavelength was 532 nm, the spectrum collection range was 600 $cm^{-1}$-1800 $cm^{-1}$, and the spectrum collection was carried out five times for each sample;

(3) After the spectral data of all the serum samples are collected, first performing dimension reduction on the serum SERS spectral data from different sources, removing irrelevant items in the sample data points, and finally screening effective dimensions capable of reflecting data difference. Specifically, the original data dimension relevancy among different samples is calculated by using the covariance matrix, and then the data points with the lowest relevancy (preferably, original 1456 dimensions are sorted according to a frequency from low to high, and two dimensions with the lowest relevancy are selected from every 60 continuous dimensions) are selected as effective dimensions after dimension reduction. And finally, still selecting two effective dimensions are from remaining continuous dimensions which are less than 60. These dimensions corresponding to different peak positions among different cases;

(4) Then, performing algorithm training: performing binary classification processing by taking the data points subjected after dimension reduction as characteristic values during algorithm training and identification, dividing all the samples into the training cohort and the test cohort, and scaling data of each sample, the scaling range of the [0, 1], the normalization formula used in a scaling process is:

$$y' = \text{lower} + (\text{upper} - \text{lower}) * \frac{y - \min}{\max - \min};$$

where, y is data before scaling, y' is data after scaling, lower and upper are minimum and maximum values of the data after scaling, and min/max are the minimum/maximum values of the data before scaling;

The corresponding support vector expansion is:

$$f(x) = w^T \phi(x) + b$$
$$= \sum_{i=1}^{N} \alpha_i y_i \phi(x_i)^T \phi(x) + b$$
$$= \sum_{i=1}^{N} \alpha_i y_i k(x, x_i) + b;$$

where, $k(x, x_i)$ is a kernel function, and the above formula shows that an optimal solution of the model can be expanded through the kernel function of the training samples;

The kernel function used in the algorithm processing is the radial basis kernel function (i.e., an RBF kernel function), that is:

$$K(x_i, x_j) = \exp\left(-\gamma \|x_i - x_j\|^2\right),$$
$$\gamma > 0;$$

γ is the hyperparameter of the Gaussian kernel function; Specifically for:

First, converting the original problem into a convex optimization problem:

the original problem:

$$\min_{w,b,\xi} \frac{1}{2}\|w\|^2 + C\sum_{i=1}^{N} \xi_i$$
$$\text{s.t. } y_i(w \cdot x_i + b) \geq 1 - \xi_i, i = 1, 2, \ldots, N;$$
$$\xi_i \geq 0, i = 1, 2, \ldots, N$$

then solving the convex optimization problem;

① Constructing a Lagrangian function for the dual problem of the original problem:

$$L(w, b, \xi, \alpha, \mu) \equiv$$
$$\frac{1}{2}\|w\|^2 + C\sum_{i=1}^{N} \xi_i - \sum_{i=1}^{N} \alpha_i(y_i(w \cdot x_i + b) - 1 + \xi_i) - \sum_{i=1}^{N} \mu_i \xi_i;$$

where, α is the Lagrangian multiplier; w is the normal vector on the plane, which determines the direction of the hyperplane; b is the displacement term, which represents the distance from the hyperplane to the origin; ξ represents the slack variable; u is the dual variable, minimum values of w, b, and ξ are firstly solved, partial derivatives are solved respectively and the derivatives are let to be 0, then results are substituted into the original function, the maximum value of α is solved for the minimum value, and then maximum value solving is converted into minimum value solving to get the dual problem:

$$\min_{\alpha} \frac{1}{2}\sum_{i=1}^{N}\sum_{j=1}^{N}\alpha_i\alpha_j y_i y_j(x_i \cdot x_j) - \sum_{i=1}^{N}\alpha_i$$

$$\text{s.t. } \sum_{i=1}^{N}\alpha_i y_i = 0;$$

$$0 \leq \alpha_i \leq C, i = 1, 2, \ldots, N$$

selecting $K(x_i, x_j) = \exp\left(-\gamma\|x_i - x_j\|^2\right), \gamma > 0$ as the kernel function;

② It follows from the fact that the KKT condition holds:

$$w^* = \sum_{i=1}^{N}\alpha_i^* y_i x_i$$

$$b^* = y_j - \sum_{i=1}^{N}\alpha_i^* y_i(x_i \cdot x_j);$$

parameters C and g are the best parameters after grid optimization by a parameter optimization tool grid.py in libsvm, where C is the penalty coefficient, that is a tolerance to an error, the higher C is, the easier it is to overfit, indicating that the error can not be tolerated; the smaller C is, the easier it is to underfit; if the C is too large or too small, the generalization ability becomes worse. g is a parameter of the RBF function after the RBF function is selected as the kernel function, implicitly determining distribution of the data mapped to a new characteristic space, the larger g is, the fewer support vectors are, the smaller g is, the more support vectors are, and the amount of support vectors affects speeds of training and prediction;

Regarding the relationship between γ and g, it is deduced from the following formula:

$$k(x, z) = \exp\left(-\frac{d(x, z)^2}{2*\sigma^2}\right) = \exp\left(-\text{gamma}\cdot d(x, z)^2\right) \Rightarrow \text{gamma} = \frac{1}{2\cdot\sigma^2};$$

where, d(x, z) is the distance, gamma=γ, which is the value of g, is equal to the hyperparameter of the Gaussian kernel function, and σ is the width parameter of the function;

After the kernel function and the parameters C and g are selected, performing training by using the training cohort to obtain an svm model for the serum SERS spectral data, a classification decision function used in this process being:

$$f(x) = \text{sign}\left(\sum_{i=1}^{N}a_i^* y_i K(x_i, x) + b^*\right);$$

where a* is obtained by the smo algorithm, $K(x_i, x)$ corresponds to the Gaussian kernel function, and b* is the threshold which has been solved in the former step;

Selecting hinge loss function as the loss function, $\lambda\|w\|^2$ being a regularization term, that is:

$$\min_{w,b} \sum_{i=1}^{N}\max(0, 1 - y_i(w\cdot x_i + b)) + \lambda\|w\|^2;$$

when samples are correctly classified: y(wx+b)>0; when samples are wrongly classified: y(wx+b)<0, the absolute value of y(wx+b) representing the distance of the sample form decision boundary, the larger the absolute value means the farther the sample being from the decision boundary. When the samples are correctly classified and the function interval is greater than 1, the hinge loss being 0, otherwise the loss being 1−y(wx+b);

(5) Testing the obtained model by using the test cohort, comparing the actual situation with model prediction result, and finally obtaining an identification accuracy rate and outputting a result.

Preferably, in step (1), the original silver nanowire solution is centrifuged at a speed of 6000 r/min.

Preferably, the original silver nanowire solution in step (1) is prepared by the following method: 1.665 g polyvinylpyrrolidone (with a molecular weight of 360000) and 0.0019 g $CuCl_2$ are firstly added into 100 ml ethylene glycol, stirring and dispersing uniformly in an ultrasonic cell to obtain the solution A; Then 1.7 g $AgNO_3$ are dissolved in 100 ml ethylene glycol to obtain the solution B; Then dropping the solution A into the solution B at a uniform speed and stirring uniformly; and finally, transferring the mixed solution to a 250 ml autoclave, sealing the autoclave and putting the autoclave into an oven for heating at 160° ° C. for 3 h. After cooling to room temperature, the original silver nanowire solution are obtained.

Preferably, before the original data dimension relevancy among different samples is calculated through the covariance in step (3), formats of all the spectral data need to be converted into the libsvm format with the help of weka software, and then the spectral data is divided into a plurality of effective frequency bands at a certain interval.

The present invention also provides an application of the above serum analysis method in high-precision identification and different SERS peak position analysis of various patients and normal individuals.

Preferably, the patients are lung cancer patients and colorectal carcinoma patients. When the serum analysis method performs high-accuracy identification and different SERS peak position analysis of lung cancer patients, colorectal carcinoma patients and normal individuals, each original data has about 1456 dimensions before dimension reduction, and dimensions are reduced to 50 after dimension reduction in step (3), which correspond to 50 SERS characteristic peak positions with obvious differences. When performing binary classification processing, serum samples from normal individuals are classified into one class, and serum samples from cancer patients are classified into the other class. In addition, a part of samples from cancer patients and normal people are subjected to algorithm training cohort, the remaining samples are subjected to cancer identification, serum spectral data of the cancer patients is used as a cancer cohort during training and identification, serum spectral data of the normal individuals is used as a normal cohort independently. After the two cohorts of data are imported to the svm model for algorithm training and identification, identification accuracy rates of the cancer patients compared with the normal individuals are finally obtained.

The analysis method can realize lung cancer identification with accuracy of 94.1% at the sensitivity of 91.84%, colorectal carcinoma identification with accuracy of 98.25% at the sensitivity of 97.73%. Also, the 50 different SERS peak positions between the lung cancer patients/colorectal carcinoma patients and the normal people are obtained, respectively. These is expected to be used for actual diagnosis and pathological nature tracing of cancers in clinic.

When the identification accuracy rate finally outputted by the analysis method is greater than 90%, the analysis method is applied to detection of the serum samples, so as to preliminarily determine whether a detected object is at least one or none of the diseased patients.

Compared with the prior art, the technical solution of the present invention has the following advantages and beneficial effects:

(1) The sample pretreatment stage does not need any biological specificity modification process to obtain the intrinsic spectroscopy signals of the serum samples, and therefore, consumable cost is relatively low, and the consumable cost for detecting each serum sample is about ¥1;

(2) The types of serum samples of cancers to be detected are not limited, and serum of lung cancer patients or colorectal carcinoma patients can be effectively distinguished from normal people serum. The identification accuracy of the two types of cancer patients compared with the normal individuals can reach more than 94%, or even approach 99%;

(3) With the help of a dimension reduction process of the artificial intelligence, different SERS peak positions of the cancer patients compared with the normal individuals can be located. As an entirely novel cancer database source, the marker information at the molecular bond energy level is expected to provide guidance for clinical cancer diagnosis and treatment;

(4) Benefited from the high sensitivity of the SERS technique and the high identification accuracy of artificial intelligence, a high-accuracy cancer diagnosis results and different peak position locating can be obtained. Also, the overall process of "sample preparation-detection-analysis-result output" takes less time with down to one hour, which provides an entirely novel idea and inspiration for the new generation of cancer diagnosis and treatment strategies.

The present invention interacts SERS spectroscopy technique and artificial intelligence technique to obtain high-accuracy cancer identification and locate peak position difference of the cancer patients and the normal individuals. Compared with the conventional medical means for serum analysis, any biological specificity modification process such as an antibody-antigen is not required about our invention, and the intrinsic spectroscopy signal of the serum sample can be obtained. Finally, a cheaper, rapider and more accurate serum signal distinguishing between the cancer patients and the normal individuals has been successfully achieved, which provides an entirely novel idea of detection and pathological information acquisition for the present clinical liquid biopsy field.

BRIEF DESCRIPTION OF THE DRAWINGS

FIG. 4 shows a screenshot of a statistical table of 50 Raman characteristic peak positions obtained after dimension reduction of the lung cancer and normal individuals serum samples in Example 2.

FIG. 6 shows a screenshot of a statistical table of 50 Raman characteristic peak positions obtained after dimension reduction of the colorectal carcinoma and normal people samples in Example 2.

DETAILED DESCRIPTION OF THE EMBODIMENTS

The following Examples 1, 2, and 3 are provided to further illustrate the present invention, but are not to be construed as limiting the present invention. Unless otherwise specified, technical means used in the examples are conventional means well known to those skilled in the art.

Example 1

Figure 1:
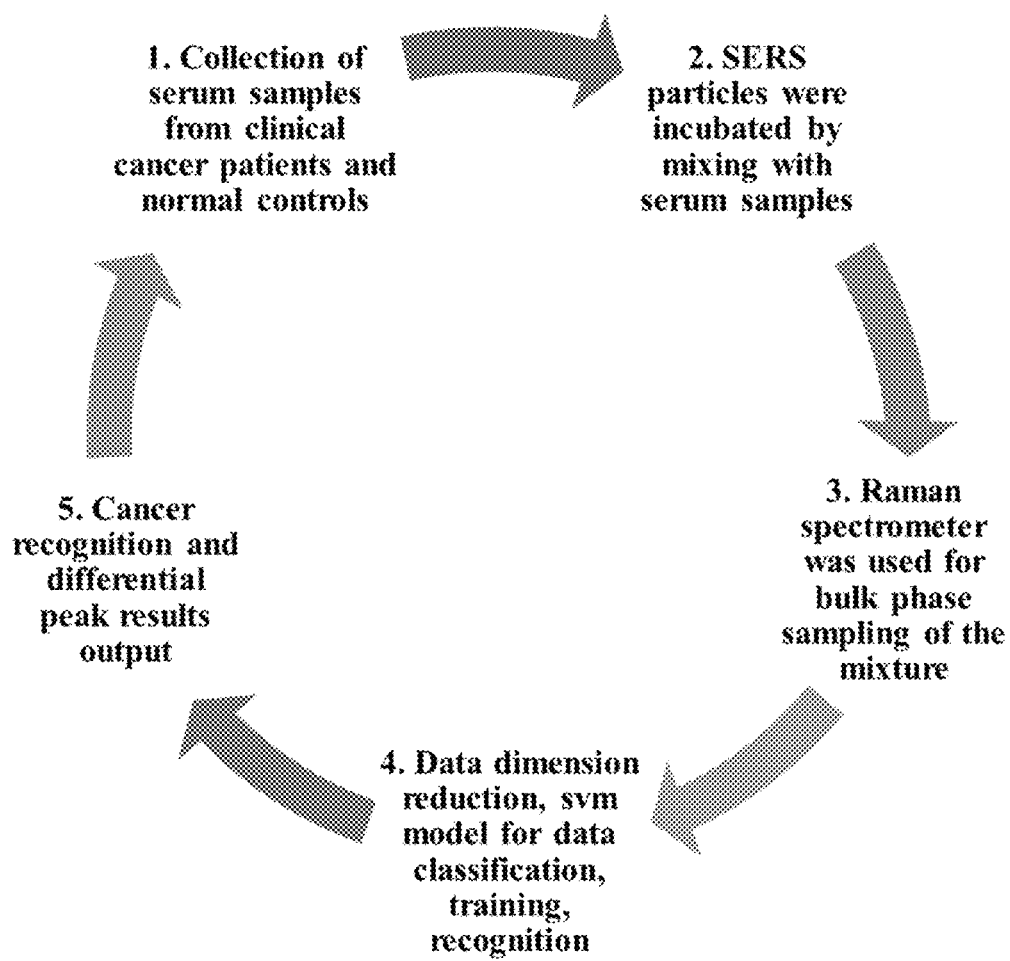
FIG. 1 shows a flow chart of a spectroscopy and artificial intelligence-interaction serum analysis method according to the present invention.

The present invention mainly combines the SERS spectrum technique in physical field with an artificial intelligence technique in computer field. As shown in FIG. 1, a serum analysis method provided by the present invention perfectly combines the SERS technique with an artificial algorithm and completes information interaction in the mode of "clinical sample collection—sample preparation—spectrum collection—data training and identification—result output-expected for clinical treatment guidance". Finally, a high-accuracy, rapid cancer identification and highly-referential different peak position locating are achieved. The method specifically includes the following steps:

(a) In clinical sample collection, human peripheral blood from 244 lung cancer patients, 216 colorectal carcinoma patients, 350 normal people and other different sources is extracted in this example. Each peripheral blood is centrifuged with the help of a centrifuge, the centrifugation time is 10 minutes, and the volume of the peripheral blood used is 1.5 ml. After the centrifugation, yellowish serum at the upper layer of the obtained liquid is carefully extracted to obtain the serum samples of the lung cancer patients, the colorectal carcinoma patients and the normal individuals for later use, respectively.

(b) In this example, silver nanowires are used as SERS probes, and the specific preparation process of original silver nanowire solution is: firstly adding 1.665 g of polyvinylpyrrolidone (with the molecular weight of 360000) and 0.0019 g of $CuCl_2$ into 100 ml of ethylene glycol, stirring and dispersing uniformly in an ultrasonic cell to obtain the solution A; then dissolving 1.7 g of $AgNO_3$ in 100 ml of ethylene glycol to obtain the solution B. Then dropping the solution A into the solution B at a uniform speed and stirring uniformly; and finally transferring the mixed solution to a 250 ml autoclave, sealing the autoclave and putting the autoclave into an oven for heating at 160° C. for 3 h, and after the reaction, cooling to room temperature. The original silver nanowire solution were obtained for later use.

The silver nanowires are centrifuged to remove impurities before Raman spectrum test, and the obtained silver nanowire has a diameter of about 100 nm and a length of 10-20 μm. The specific operation of centrifugation is: 4.5 ml original silver nanowire solution are taken for centrifugation with a keeping speed at 6000 r/min. After 10 min, removing all supernatant with a pipette, resuspending obtained silver nanowire precipitate with 1 ml deionized water, and finally dispersing it evenly with an ultrasonic cleaner to obtain the concentrated silver nanowire solution.

(c) SERS test sample preparation is then performed. 30 μl of the serum sample is firstly taken into a 100 μl conical tube with a pipette, and then 15 μl of the concentrated silver nanowire solution is taken and fully mixed with the serum sample; At this time, the volume ratio of the silver nanowire solution to the serum sample is fixed at 1:2 (to ensure that the same amount of SERS microprobes is added to each serum sample of the same volume), the silver nanowire microprobes are fully contacted with the serum. After 10 minutes mixed incubation at room temperature, 30 μl of the incubated mixture is transferred to a cap of the inverted conical tube for Raman spectrum test. The sample is firstly focused below a liquid level with the help of confocal microscope, and the lens used for spectrum collection is a 50× confocal lens, the laser wavelength is 532 nm, the spectrum collection range is 600 $cm^{-1}$-1800 $cm^{-1}$. After the same treatment, each serum sample is subjected to sample collection for 5 times, and the total time for each sample to be subjected to sample collection for 5 times is about 15 minutes.

Example 2

Figure 2A:
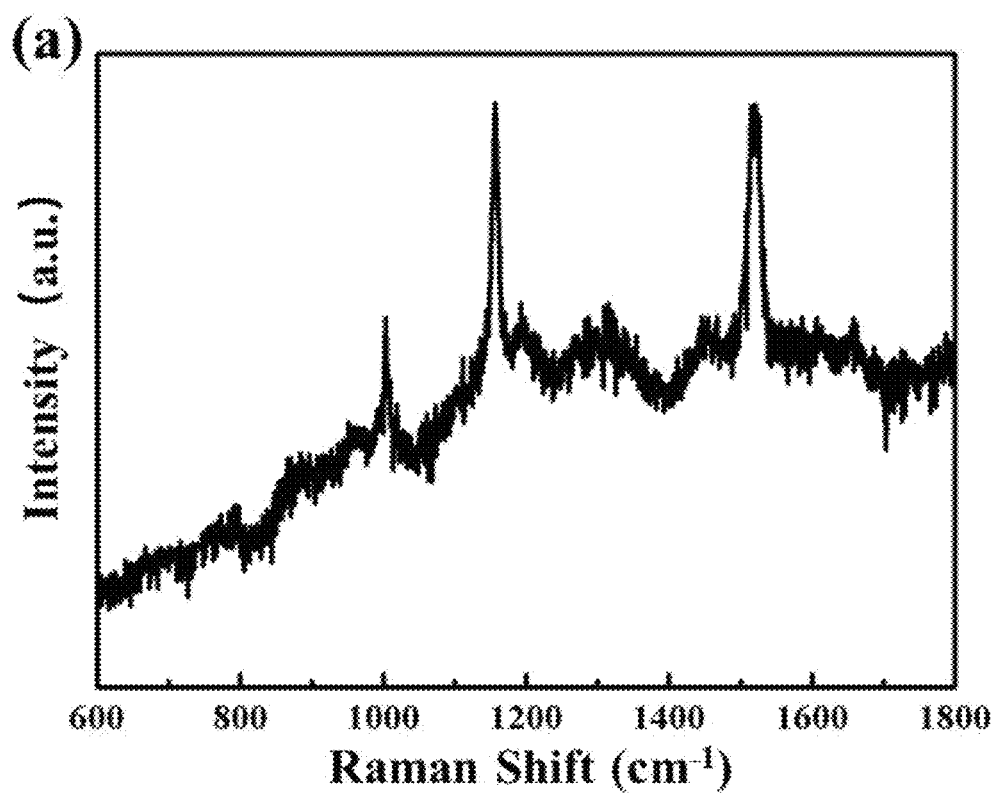
FIGS. 2A-2D show a typical SERS map and summary maps of some serum from normal individuals, colorectal carcinoma patients, and lung cancer patients in Example 2.

After the steps of "clinical sample collection—sample preparation—spectrum collection" in Example 1 are completed, all collected Raman spectrum data of 350 normal individuals, 244 lung cancer patients and 216 colorectal carcinoma patients were screened. Spectrum data with the best repeatability among the five times of data of each sample is finally selected as a final spectrum collection result. FIG. 2A shows a typical SERS spectrogram of a normal human serum sample after screening, and it can be found that there are obvious characteristic peaks, which also confirms extremely high detection sensitivity of the SERS technique.

Figure 2B:
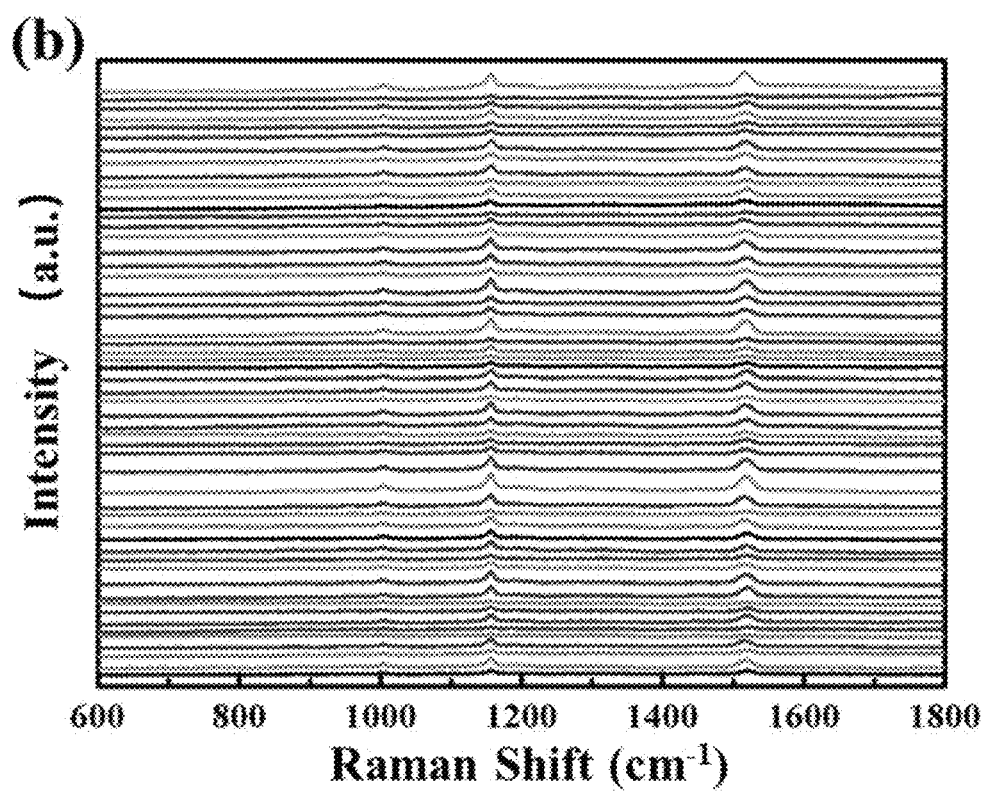
Figure 2C:
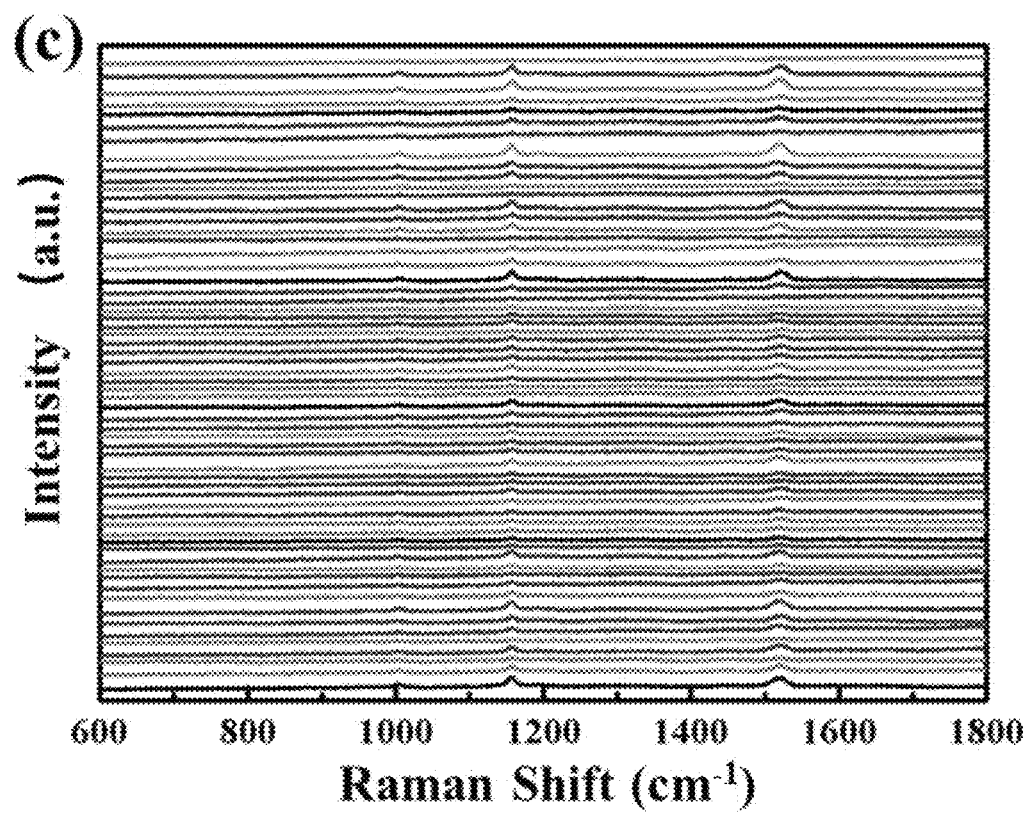
Figure 2D:
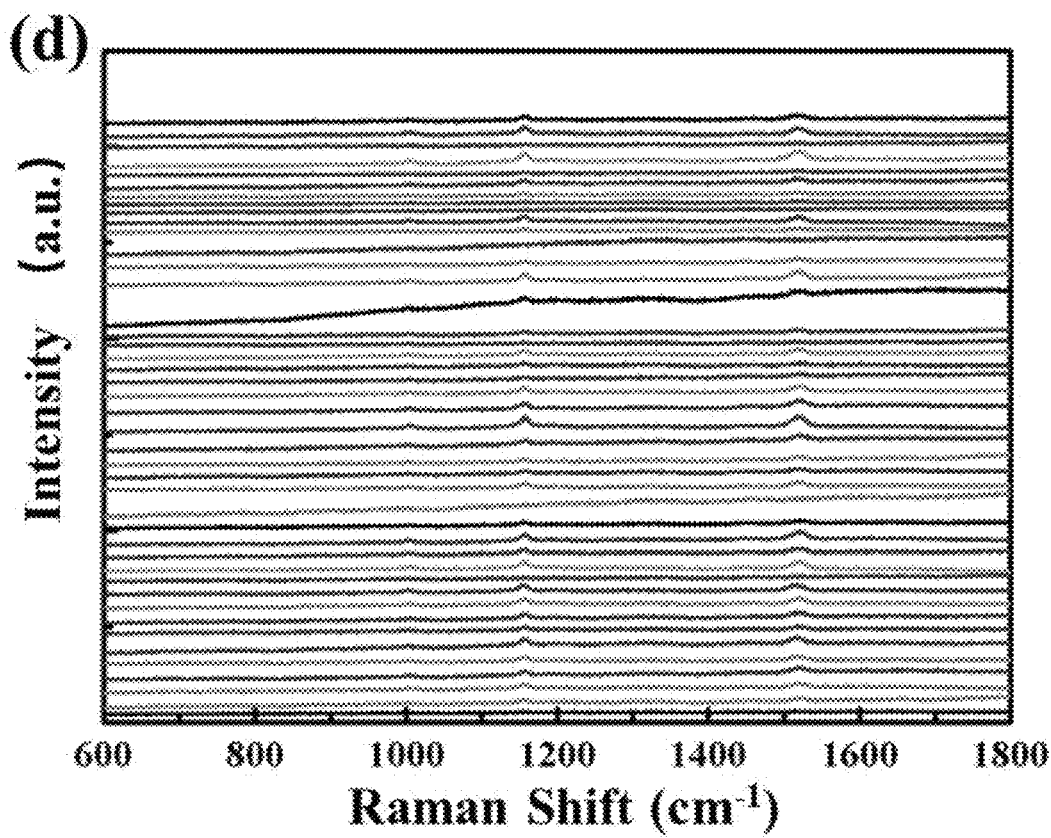

After all the Raman spectrum collection data is screened, SERS maps of all the serum samples from different sources can be obtained. FIG. 2B shows a serum SERS summary map of a plurality of cases of normal individuals, and it can be found that each serum spectrum curve of the normal individuals has obvious characteristic peak positions, and all the spectrum curves have certain common characteristic peak positions. FIG. 2C and FIG. 2D show serum SERS summary maps of a plurality of cases of lung cancer patients, colorectal carcinoma patients, respectively. It can be found that each spectrum curve of the lung cancer patients and the colorectal carcinoma patients also has obvious characteristic peak positions. Although all the spectrum curves in FIGS. 2A-2D have certain common characteristic peak positions, certain characteristic peaks of these cancer patients are slightly different from those of the normal individuals. By visual observation and comparison of the serum SERS summary maps of the normal individuals in FIG. 2B, the lung cancer and colorectal carcinoma patients in FIG. 2C and FIG. 2D, slight differences can be found. But the systematic statistical analysis of spectral data from different sources is impossible.

Based on the bottleneck problem of analyzing the spectrum data in batch, the present invention provides a method for statistically processing, analyzing and identifying a large amount of serum SERS spectrum data by means of the artificial intelligence algorithm technique. The algorithm tool used by the present invention is libsvm, and before svm model training and test are performed by using the serum spectrum data, formats of all the spectral data are firstly converted into the format required by the libsvm with the help of weka software. Since the data for each sample is a data point between 600 $cm^{-1}$ and 1800 $cm^{-1}$, this frequency range included a total of 1456 detailed data points. The abscissas of the SERS spectral data of all samples have the same frequency, but the corresponding peak intensity of each sample at each frequency is different. Therefore, each frequency is regarded as an index value, and the corresponding peak intensity is a dimension. In this way, data of each sample becomes 1456-dimension data, and the 1456 dimensions are sorted from low to high according to the frequency. However, not every dimension is useful, some dimensions do not have characteristics. Therefore, data cleaning and characteristic dimension reduction are performed next.

Figure 3:
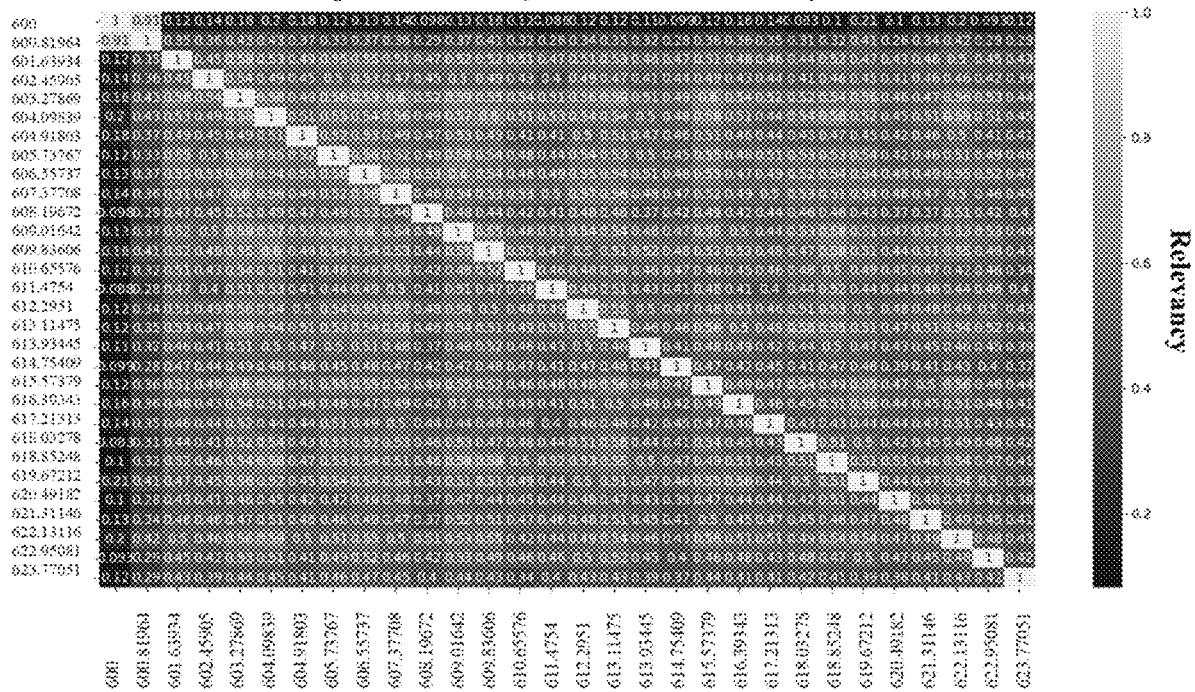
FIG. 3 shows a partial dimension heat map of serum SERS spectral data of 244 lung cancer samples ξ 350 normal individuals in Example 2.
Figure 5:
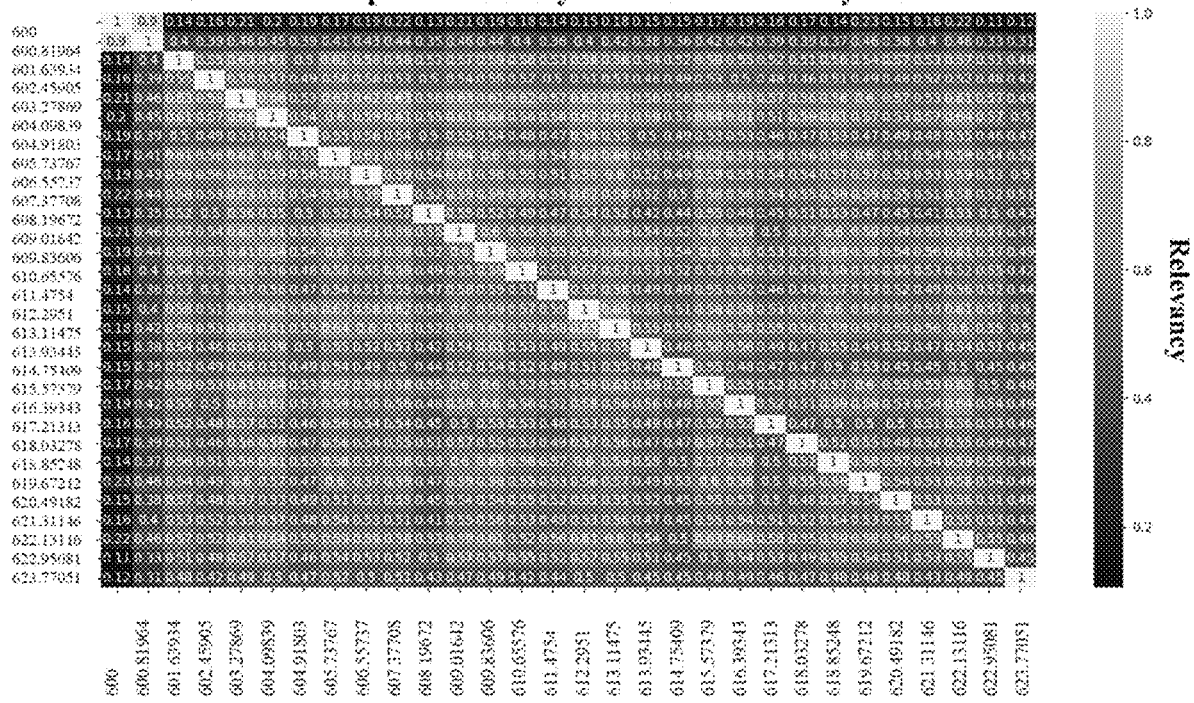
FIG. 5 shows a partial dimension heat map of serum SERS spectral data of 216 colorectal carcinoma samples ξ 350 normal individuals in Example 2.

In this example, the normal individuals are divided into one class and the patients with two types of cancers are divided into the other class in the process of dimension reduction. Specifically, the original spectrum data of a frequency band of 600 $cm^{-1}$ to 1800 $cm^{-1}$ is divided into a plurality of effective frequency bands by taking 60 $cm^{-1}$ as the interval, and then relevancy between the characteristics of each band in different frequency bands is calculated by using covariance. A relevancy degree is between −1 and 1, the closer to −1 and 1, the greater the relevancy, and the closer to 0, the smaller the relevancy. Finally, the relevancy of frequency characteristics in different ranges is presented in the form of heat map. FIG. 3 shows a relevancy heat map of the 244 lung cancer samples compared with 350 normal control samples in a frequency band of 600 $cm^{-1}$-623.7705 $cm^{-1}$, in which it can be clearly found that relevancy between different dimensions shows obvious difference distribution. In the dimension reduction process, two dimensions with the lowest relevancy are selected from every 60 continuous dimensions as effective characteristic points, and two effective dimensions are still selected from remaining continuous dimensions which are less than 60, the original 1456 dimensions are finally reduced to 50 dimensions, which correspond to 50 characteristic Raman frequencies. Specific dimension difference details of the SERS spectra between all lung cancer patients and the normal people are shown in FIG. 4. These 50 Raman peak positions represent 50 differences between the serum SERS spectra of the lung cancer patients and those of the normal individuals. Similarly, FIG. 5 shows a relevancy heat map of the 216 colorectal carcinoma samples compared with the 350 normal control samples in the frequency band of 600 $cm^{-1}$-623.7705 $cm^{-1}$, in which it can be clearly found that relevancy between different dimensions shows obvious difference distribution. Correspondingly, specific dimension difference details of the SERS spectra between the colorectal carcinoma patients and the normal people are shown in FIG. 6. In conclusion, the method can simplify a complicated SERS peak position process and realize more accurate SERS difference peak position (that is, a cancer characteristic dimension at a molecular bond energy level) locating.

Example 3

Figure 7:
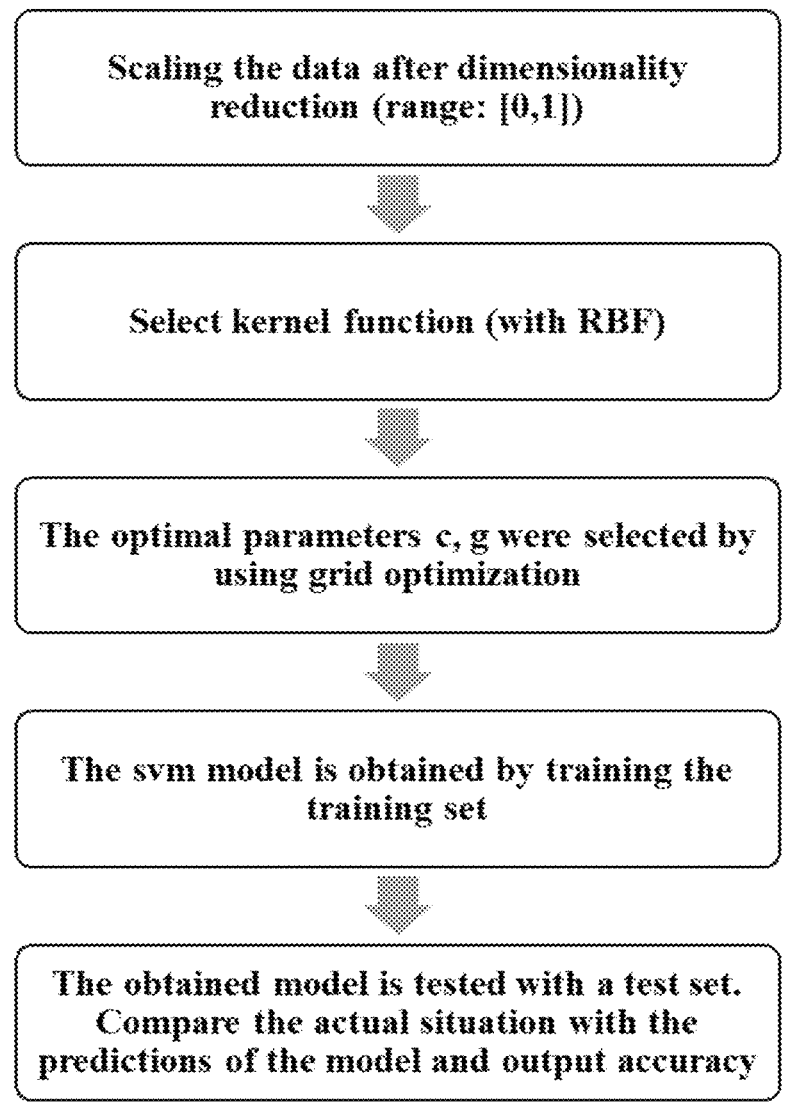
FIG. 7 shows a flow chart of identification accuracy output for colorectal carcinoma patients, lung cancer patients, and normal individuals in Example 3.

After the dimension reduction in Example 2 is completed, the SERS spectrogram of each serum sample can be reduced to 50 dimensions, and then all data is processed according to a flow chart shown in FIG. 7, and following two types of training and identification are performed: the label of serum spectral data of a colorectal carcinoma patient is 1, and the label of serum spectral data of a normal person is 0, which is used to judge whether to be a colorectal carcinoma patient; Or the label of serum spectral data of a lung cancer patient is 1, and the label of serum spectral data of a normal person is 0, which is used to judge whether to be a lung cancer patient.

Figure 8:
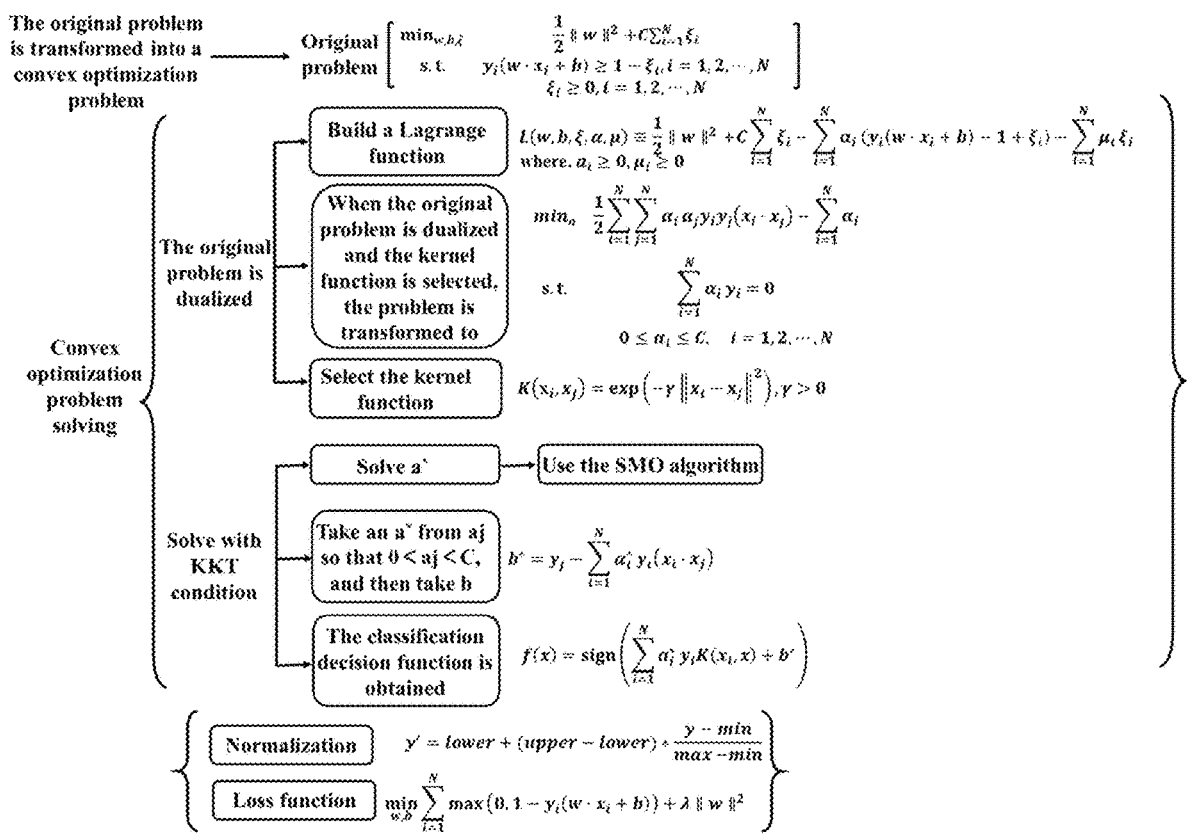
FIG. 8 shows a logic diagram of the arithmetic operation for colorectal carcinoma patients, lung cancer patients, and normal people in Example 3.

A logic chart of arithmetic operation in this example is shown in FIG. 8. During the arithmetic operation, each of the above cases is divided into a training set and a test set by 8:2, and then the data is scaled to a range of [0, 1]. As the data is too scattered, the data is relatively concentrated after scaling, which can solve an impact of some singular data. A normalization formula used in a scaling process is:

$$y' = \text{lower} + (\text{upper} - \text{lower}) * \frac{y - \min}{\max - \min};$$

where, y is data before scaling, y' is data after scaling, lower and upper are minimum and maximum values of the data after scaling, and min/max are minimum/maximum values of the data before scaling.

The corresponding support vector expansion is:

$$f(x) = w^T \phi(x) + b$$
$$= \sum_{i=1}^{N} \alpha_i y_i \phi(x_i)^T \phi(x) + b$$
$$= \sum_{i=1}^{N} \alpha_i y_i k(x, x_i) + b$$

where, $k(x, x_i)$ is a kernel function, and the above formula shows that an optimal solution of the model can be expanded through the kernel function of the training samples.

The kernel function used in the algorithm processing is a radial basis kernel function (that is, RBF kernel function). The kernel function maps samples to a higher-dimension space nonlinearly. Different from a linear kernel, the kernel function can deal with a nonlinear relationship between classification, labeling and attributes, and shows good performance in practical problems. An specific expression is:

$$K(x_i, x_j) = \exp(-\gamma \|x_i - x_j\|^2),$$
$$\gamma > 0;$$

$\gamma$ is the hyperparameter of a Gaussian kernel function. Specifically:

first, the original problem is converted into a convex optimization problem:

the original problem:

$$\min_{w,b,\xi} \frac{1}{2}\|w\|^2 + C\sum_{i=1}^{N} \xi_i$$
$$\text{s.t.} \quad y_i(w \cdot x_i + b) \geq 1 - \xi_i, i = 1, 2, \ldots, N;$$
$$\xi_i \geq 0, i = 1, 2, \ldots, N$$

then the convex optimization problem is solved;
① for the dual problem of the original problem, the Lagrangian function is constructed:

$$L(w, b, \xi, \alpha, \mu) \equiv$$
$$\frac{1}{2}\|w\|^2 + C\sum_{i=1}^{N} \xi_i - \sum_{i=1}^{N} \alpha_i(y_i(w \cdot x_i + b) - 1 + \xi_i) - \sum_{i=1}^{N} \mu_i \xi_i;$$

where, α is the Lagrangian multiplier; w is the normal vector on plane, which determines the direction of a hyperplane; b is the displacement term, which represents the distance from the hyperplane to the origin; ξ represents the relaxation variable; and u is the dual variable. Minimum values of w, b, and ξ are firstly solved, partial derivatives are solved respectively and the derivatives are let to be 0, then results are substituted into the original function, the maximum value of a is solved for the minimum value, and then maximum value solving is converted into minimum value solving to get the dual problem:

$$\min_{\alpha} \frac{1}{2}\sum_{i=1}^{N}\sum_{j=1}^{N} \alpha_i \alpha_j y_i y_j (x_i \cdot x_j) - \sum_{i=1}^{N} \alpha_i$$
$$\text{s.t.} \quad \sum_{i=1}^{N} \alpha_i y_i = 0$$
$$0 \leq \alpha_i \leq C, i = 1, 2, \cdots, N$$
$$K(x_j, x_j) = (-\gamma\|x_i - x_j\|^2), \gamma > 0$$

is selected as the kernel function;
② from KKT condition establishment, the following is obtained:

$$w^* = \sum_{i=1}^{N} \alpha_i^* y_i x_i$$
$$b^* = y_j - \sum_{i=1}^{N} \alpha_i^* y_i (x_i \cdot x_j);$$

It should be noted that:

The parameters C and g in the present invention are the best parameters after grid optimization by the grid. py in the libsvm, C is the penalty coefficient, that is a tolerance to error, the higher C is, the easier it is to overfit. It indicates that the error can not be tolerated. The smaller C is, the easier it is to underfit; if the C is too large or too small, generalization ability becomes worse. G is a parameter of the RBF function after the RBF function is selected as the kernel function, implicitly determining distribution of the data mapped to a new characteristic space, the larger g is, the fewer support vectors are, the smaller g is, the more support vectors are, and the amount of support vectors affects speeds of training and prediction.

A relation between γ and g is deduced from the following formula:

$$k(x, z) = \exp\left(-\frac{d(x, z)^2}{2*\sigma^2}\right) = \exp\left(-\text{gamma} \cdot d(x, z)^2\right) \Rightarrow \text{gamma} = \frac{1}{2 \cdot \sigma^2};$$

where, d(x, z) is the distance, gamma=γ, that is, the value of g is equal to the hyperparameter of the Gaussian kernel function, and σ is the width parameter of the function.

In the example, when the label of serum spectral data of the colorectal carcinoma patient is 1, and the label of serum spectral data of the normal person is 0, C=8 and g=0.0488; and when the label of serum spectral data of the lung cancer patient is 1, and the label of serum spectral data of the normal person is 0, C=8 and g=0.25.

After the kernel function and the parameters C and g are selected, training is performed by using the training set to obtain the svm model for the serum SERS spectral data, and a classification decision function used in this process is:

$$f(x) = \text{sign}\left(\sum_{i=1}^{N} \alpha_i^* y_i K(x_i, x) + b^*\right);$$

where, a* is the optimal solution for a set of $a_i$ satisfying the condition and obtained by an smo algorithm, K ($x_i$, x) corresponds to the Gaussian kernel function, and b* is the threshold and is already solved in the former step.

The hinge loss function is selected as loss function, is the regularization term, that is:

$$\min_{w,b} \sum_{i=1}^{N} \max(0, 1 - y_i(w \cdot x_i + b)) + \lambda \|w\|^2;$$

when samples are correctly classified: y(wx+b)>0; and when samples are wrongly classified: y(wx+6)<0. The absolute value of y(wx+b) represents the distance between the sample and the decision boundary. The larger the absolute value is, the farther the sample is from the decision boundary. When the samples are correctly classified and the function interval is greater than 1, the hinge loss is 0, or otherwise the loss is 1−y(wx+b).

The obtained model is then tested by using the test set, the actual situation is compared with the model prediction result, and finally the identification accuracy rate is obtained and the result is outputted.

Figure 9A:
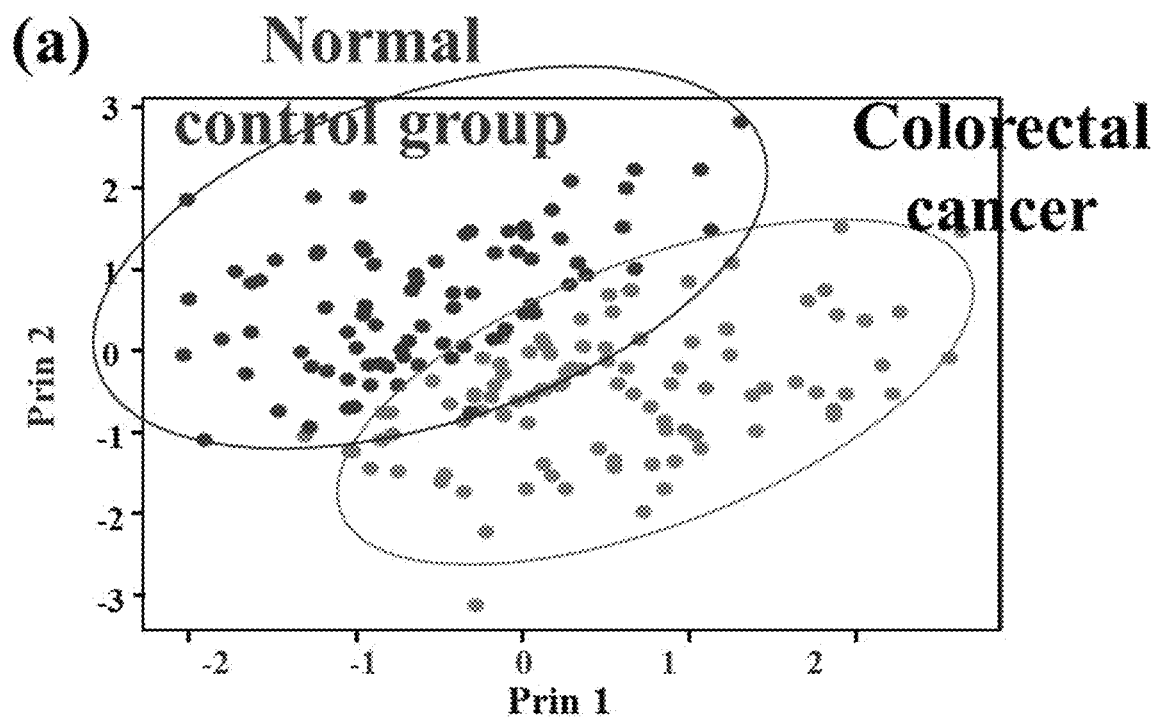
FIGS. 9A-9C show the scatter distribution charts, accuracy, and sensitivity statistical chart for three types of samples identification from colorectal carcinoma patients, lung cancer patients, and normal individuals in Example 3.
Figure 9B:
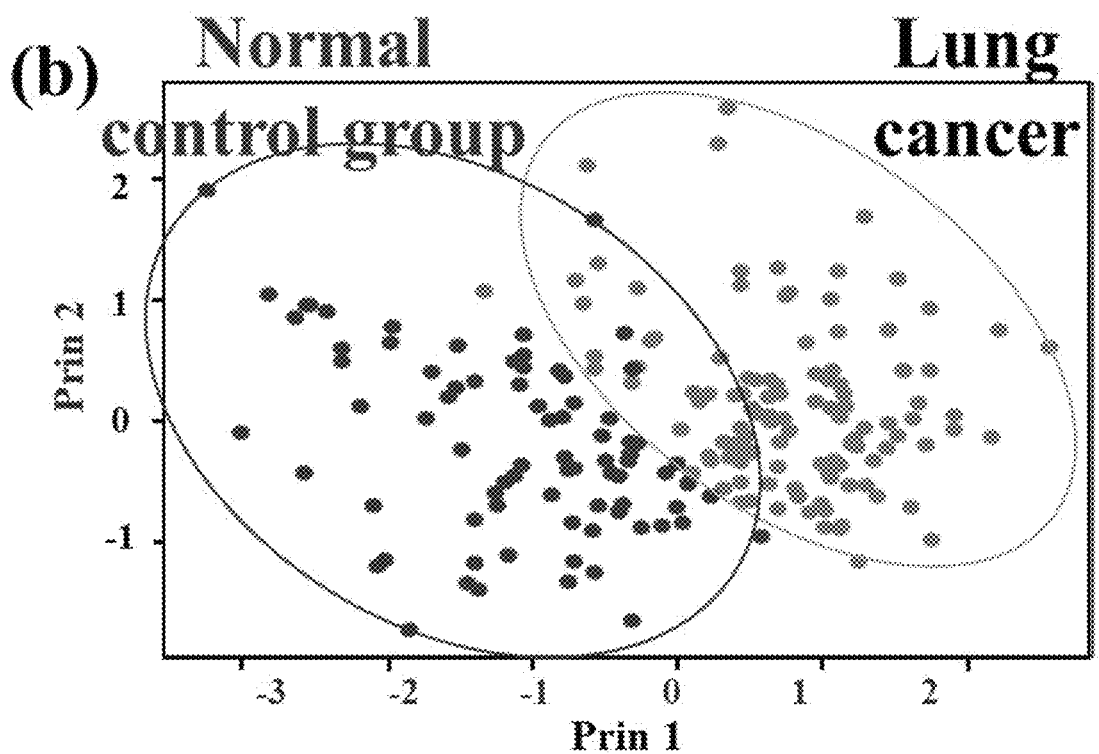
Figure 9C:
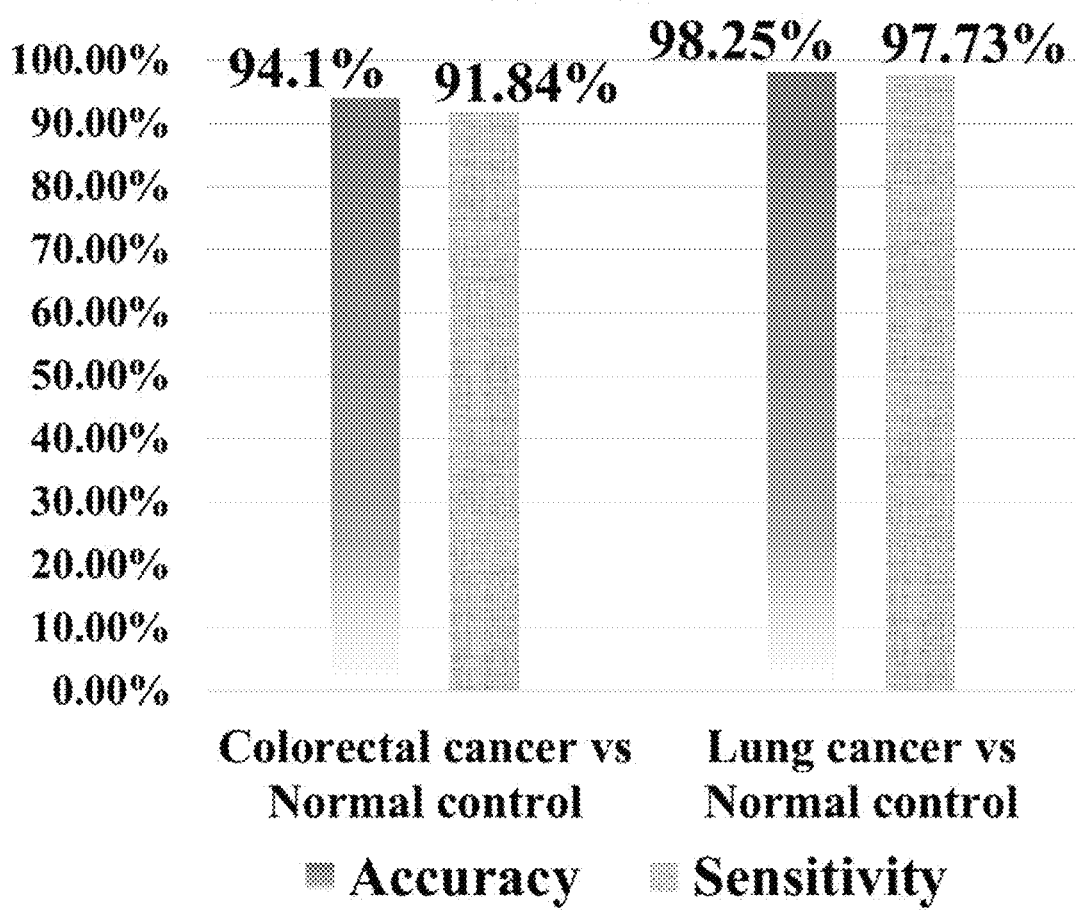

FIGS. 9A-9B show scatter distribution charts for three different data sets, and it can be found that the algorithm model established by the present invention has an excellent classification effect for serum Raman data from different sources, wherein the classification and identification effects for colorectal carcinoma are slightly better than those for the lung cancer. In addition, by observing FIG. 9C, it can be found that the lung cancer and the colorectal carcinoma compared with the normal individuals achieve high-sensitivity identification with the identification accuracy rate higher than 94.1% and the sensitivity higher than 91.84%. Specifically, the lung cancer identification with the accuracy of 94.1% at the sensitivity of 91.84% and colorectal carcinoma identification with the accuracy of 98.25% at the sensitivity of 97.73% can be realize. The specific identification effects approach 100%. Therefore, the spectroscopy and artificial intelligence-interaction serum analysis method provided by the present invention can realize high-accuracy cancer detection, which is of great significance to rapid, high-accuracy and non-invasive detection of clinical cancers.

In addition, it should be emphasized that compared with high-accuracy cancer detection and analysis of a single serum sample, the method of the present invention takes a very short time, the whole process of sample collection—sample preparation-spectrum collection—algorithm training—identification accuracy result output takes about 1 hour, and cost of a consumable (a silver nanowire solution) is less than ¥1 except for cost of a detection instrument itself. This is of great significance for the current field of liquid biopsy of cancer, which may solves the problems of strong invasiveness, long detection cycle and high cost of traditional medical methods in the process of time-consuming cancer detection.

The above examples are preferred implementation modes of the present invention, but the implementation modes of the present invention are not limited by the above examples. Any other changes, modifications, substitutions, combinations, and simplifications that do not deviate from the spirit and principle of the present invention should be equivalent and included in the scope of protection of the present invention.

What is claimed is:

1. A spectroscopy and artificial intelligence-interaction serum analysis method comprising:
    (1) preparing a purified silver nanowire solution, wherein the purified silver nanowire solution includes silver nanowires without an intrinsic Raman signal as surface enhanced Raman scattering (SERS) probes; and in addition, centrifuging peripheral blood plasma samples of patients with different types of diseases and normal people to obtain corresponding serum samples;
    (2) performing liquid-phase mixing and incubation on the silver nanowire solution and the serum samples according to a same proportion to ensure that the silver nanowires are fully contacted with the serum samples, and after incubation, performing bulk SERS spectral data collection on the serum samples by using a Raman spectrometer, wherein to implement the bulk SERS spectral data, a laser having a wavelength of 532 nm is employed such that a spectrum collection range is 600 $cm^{-1}$-1800 $cm^{-1}$, and each sample is subjected to the bulk SERS spectral data collection for 5 times;
    (3) after the performing the bulk SERS spectral data collection, performing dimension reduction on serum SERS spectral data from different sources to remove irrelevant items in sample data points, and screening effective dimensions capable of reflecting data difference by calculating an original data dimension relevancy among different samples by using a covariance matrix, and then taking data points with a lowest relevancy as effective dimensions after the dimension reduction, the effective dimensions corresponding to different peak positions among different sample types of the serum samples;
    (4) performing algorithm training: performing binary classification processing to obtain identification accuracy rates of different diseased samples of the serum samples compared with normal samples of the serum samples by taking the data points subjected to the dimension reduction as characteristic values during algorithm training and identification, obtaining a training set of samples and utilizing at least a portion of the serum samples as a test set, and scaling data of each sample, a scaling range being [0, 1], a normalization formula used in a scaling process being:

$$y' = \text{lower} + (\text{upper} - \text{lower}) * \frac{y - \min}{\max - \min};$$

wherein, y is data before scaling, y' is data after scaling, lower and upper are minimum and maximum values of the data after scaling, and min/max are minimum/maximum values of the data before scaling;

a corresponding support vector expansion being:

$$\begin{aligned} f(x) &= w^T \phi(x) + b \\ &= \sum_{i=1}^{N} \alpha_i y_i \phi(x_i)^T \phi(x) + b \\ &= \sum_{i=1}^{N} \alpha_i y_i k(x, x_i) + b \end{aligned};$$

wherein, $k(x, x_i)$ is a kernel function, N is a number of support vectors, x denotes an input sample data set, f(x) denotes a decision function, $w^T$ denotes a normal vector, $\phi(x)$ maps the input sample data set to a feature space, b is a displacement term, $\alpha_i$ is a Lagrange multiplier, and $y_i$ denotes a support vector label and the above formula shows that an optimal solution of the support vector machine model is expanded through the kernel function of training samples;

the kernel function used in the algorithm processing being a radial basis kernel function (that is, an RBF kernel function), that is:

$$K(x_j, x_j) = \exp(-\gamma \|x_i - x_j\|^2), \gamma > 0;$$

γ being a hyperparameter of a Gaussian kernel function and $x_i$ and $x_j$ denoting two sample vectors in a feature space;

specifically:

first, converting an original problem into a convex optimization problem:

the original problem:

$$\begin{aligned} \min_{w,b,\xi} \quad & \frac{1}{2}\|w\|^2 + C\sum_{i=1}^{N}\xi_i \\ \text{s.t.} \quad & y_i(w \cdot x_i + b) \geq 1 - \xi_i, i = 1, 2, \cdots, N \\ & \zeta_i \geq 0, \quad i = 1, 2, \cdots, N \end{aligned};$$

then solving the convex optimization problem;

① For a dual problem of the original problem, constructing a Lagrangian function:

$$L(w, b, \xi, \alpha, \mu) \equiv \frac{1}{2}\|w\|^2 + C\sum_{i=1}^{N}\xi_i 1^2 - \sum_{i=1}^{N}\alpha_i(y_i(w \cdot x_i + b) - 1 + \xi_i) - \sum_{i=1}^{N}\mu_i\xi_i;$$

wherein, α is a Lagrangian multiplier; w is a normal vector on plane and determines a direction of a hyperplane; b is a displacement term and represents a distance from the hyperplane to an origin; ξ represents a relaxation variable; u is a dual variable, minimum values of w, b, and ξ are firstly solved, partial derivatives are solved respectively and the derivatives are let to be 0, then results are substituted into the original function, the maximum value of α is solved for the minimum value, and then maximum value solving is converted into minimum value solving to get the dual problem:

$$\begin{aligned} \min_{\alpha} \quad & \frac{1}{2}\sum_{i=1}^{N}\sum_{j=1}^{N}\alpha_i\alpha_j y_i y_j(x_i \cdot x_j) - \sum_{i=1}^{N}\alpha_i \\ \text{s.t.} \quad & \sum_{i=1}^{N}\alpha_i y_i = 0 \\ & 0 \leq \alpha_i \leq C, \quad i = 1, 2, \cdots, N \end{aligned};$$

selecting $K(x_j, x_j) = (-\gamma \|x_i - x_j\|^2), \gamma > 0$ as the kernel function;

② from Karush-Kuhn-Tucker (KKT) condition establishment, obtaining:

$$w^* = \sum_{i=1}^{N} \alpha_i^* y_i x_i$$

$$b^* = y_j - \sum_{i=1}^{N} \alpha_i^* y_i(x_i \cdot x_j);$$

wherein, C is a penalty coefficient, that is a tolerance to an error, g is a parameter of the Radial Basis Function (RBF) function after the RBF function is selected as the kernel function, * denotes the optimal solution, and best parameters for C and g are selected by grid optimization through a parameter optimization tool grid. py in libsvm;

a relation between γ and g being deduced from the following formula:

$$k(x, z) = \exp\left(-\frac{d(x, z)^2}{2*\sigma^2}\right) = \exp\left(-\text{gamma} \cdot d(x, z)^2\right) \Rightarrow \text{gamma} = \frac{1}{2 \cdot \sigma^2};$$

wherein, d(x, z) is the distance, gamma=γ, that is, a value of g is equal to the hyperparameter value of the Gaussian kernel function, and σ is a width parameter of the function;

after the kernel function and the parameters C and g are selected, performing training by using the training set to obtain an svm model for the serum SERS spectral data, a classification decision function used in this process being:

$$f(x) = \text{sign}\left(\sum_{i=1}^{N} \alpha_i^* y_i K(x_i, x) + b^*\right);$$

wherein a* is obtained by an smo algorithm, K ($x_i$, x) corresponds to the Gaussian kernel function, and b* is a threshold;

selecting a hinge loss function as the loss function, $$\lambda\|w\|^2$$

being a regularization term, wherein $\lambda$ is a regularization parameter, that is:

$$\min_{w,b} \sum_{i=1}^{N} \max(0, 1 - y_i(w \cdot x_i + b)) + \lambda \|w\|^2;$$

and (5) testing the obtained model by using the test set, comparing an actual situation with a model prediction result, and finally obtaining identification accuracy rate and outputting a result.

2. The spectroscopy and artificial intelligence-interaction serum analysis method of claim 1, wherein, in step (1), the original silver nanowire solution is centrifuged at a rotation speed of 6000 r/min.

3. The spectroscopy and artificial intelligence-interaction serum analysis method of claim 2, wherein identification accuracy rates include a cancer identification accuracy rate.

4. The spectroscopy and artificial intelligence-interaction serum analysis method of claim 1, wherein identification accuracy rates include a cancer identification accuracy rate.

5. The spectroscopy and artificial intelligence-interaction serum analysis method of claim 4, wherein, when performing the binary classification processing in step (4) of the spectroscopy and artificial intelligence-interaction serum analysis method, serum samples from normal individuals are classified into one class, and serum samples from a certain cancer patient are classified into the other class; in addition, a part of samples from cancer patients and normal individuals are subjected to algorithm training, the remaining samples are subjected to cancer identification, serum spectral data of the certain cancer patient is used as a cancer class during training and identification, serum spectral data of the normal individuals is used as a normal class independently, and finally an accuracy of cancer identification is obtained.

6. The spectroscopy and artificial intelligence-interaction serum analysis method of claim 5, wherein the patients are lung cancer patients and colorectal carcinoma patients.

7. The spectroscopy and artificial intelligence-interaction serum analysis method of claim 6, wherein when accurate identification and different SERS peak position analysis of the lung cancer patients, the colorectal carcinoma patients and the normal individuals are performed by the spectroscopy and artificial intelligence-interaction serum analysis method, in step (3), original spectral data of each serum sample has 1456 dimensions before the dimension reduction, and dimensions are reduced to 50 after the dimension reduction, and correspond to 50 SERS characteristic peak positions with obvious differences and belong to a source of a cancer-related database at a molecular bond energy level.

\* \* \* \* \*